(12) United States Patent
Nardi et al.

(10) Patent No.: US 11,884,269 B2
(45) Date of Patent: Jan. 30, 2024

(54) SYSTEMS AND METHODS FOR DETERMINING FUTURE INTENTIONS OF OBJECTS

(71) Applicant: Argo AI, LLC, Pittsburgh, PA (US)

(72) Inventors: Lorenzo Nardi, Bavaria (DE); Andreas Eberlein, Bavaria (DE); Constantin Savtchenko, Sewickley, PA (US); Greydon Foil, Pittsburgh, PA (US); Andrew T. Hartnett, West Hartford, CT (US); G. Peter K. Carr, Allison Park, PA (US); Jagjeet Singh, Pittsburgh, PA (US); Bangjie Liu, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 252 days.

(21) Appl. No.: 17/179,510

(22) Filed: Feb. 19, 2021

(65) Prior Publication Data

US 2022/0266822 A1    Aug. 25, 2022

(51) Int. Cl.
*B60W 30/095* (2012.01)
*B60W 60/00* (2020.01)
(Continued)

(52) U.S. Cl.
CPC ........ *B60W 30/0956* (2013.01); *B60W 30/09* (2013.01); *B60W 50/0097* (2013.01);
(Continued)

(58) Field of Classification Search
CPC ............. B60W 30/0956; B60W 30/09; B60W 50/0097; B60W 60/001; B60W 2420/42;
(Continued)

(56) References Cited

U.S. PATENT DOCUMENTS 9,120,484 B1 * 9/2015 Ferguson ................ B60T 17/18
9,187,088 B1 * 11/2015 Ferguson ............... G06N 20/00
(Continued)

FOREIGN PATENT DOCUMENTS

WO    2017079349 A1    5/2017

OTHER PUBLICATIONS

Houenou, A., Bonnifait, P., Cherfaoui, V., & Yao, W. (Nov. 2013). Vehicle trajectory prediction based on motion model and maneuver recognition. In 2013 IEEE/RSJ international conference on intelligent robots and systems (pp. 4363-4369). IEEE. Added for publication in IEEE Xplore at Jan. 6, 2014.
(Continued)

*Primary Examiner* — Rachid Bendidi
*Assistant Examiner* — Moises Gasca Alva
(74) *Attorney, Agent, or Firm* — Fox Rothschild LLP

(57) ABSTRACT

Systems/methods for operating an autonomous vehicle. The methods comprise, by a computing device: using sensor data to track an object that was detected in proximity to the autonomous vehicle; classifying the object into at least one dynamic state class of a plurality of dynamic state classes; transforming the at least one dynamic state class into at least one goal class of a plurality of goal classes; transforming the at least one goal class into at least one proposed future intention class of a plurality of proposed future intention classes; determining at least one predicted future intention of the object based on the proposed future intention class; and/or causing the autonomous vehicle to perform at least one autonomous driving operation based on the at least one predicted future intention determined for the object.

15 Claims, 9 Drawing Sheets

(51) Int. Cl.
*B60W 30/09* (2012.01)
*B60W 50/00* (2006.01)
*B64C 39/02* (2023.01)

(52) U.S. Cl.
CPC ....... *B60W 60/001* (2020.02); *B60W 2420/42* (2013.01); *B60W 2420/52* (2013.01); *B60W 2420/54* (2013.01); *B64C 39/024* (2013.01); *B64U 2201/10* (2023.01)

(58) Field of Classification Search
CPC ......... B60W 2420/52; B60W 2420/54; B60W 2554/402; B60W 2554/4026; B60W 2554/4029; B60W 2554/4041; B60W 2554/4042; B60W 2554/4045; B60W 60/0027; B64U 2201/10
See application file for complete search history.

(56) References Cited

U.S. PATENT DOCUMENTS

| | | | |
|---|---|---|---|
| 9,428,187 B2 | 8/2016 | Lee | |
| 2017/0132334 A1* | 5/2017 | Levinson | G01S 17/931 |
| 2019/0025841 A1* | 1/2019 | Haynes | G05D 1/0214 |
| 2019/0061765 A1 | 2/2019 | Marden et al. | |
| 2019/0152490 A1* | 5/2019 | Lan | B60W 50/0097 |
| 2019/0250626 A1* | 8/2019 | Ghafarianzadeh | G06N 7/01 |
| 2019/0367021 A1* | 12/2019 | Zhao | B60W 60/0011 |
| 2019/0369616 A1* | 12/2019 | Ostafew | B60W 60/00274 |
| 2020/0122721 A1 | 4/2020 | Zhang et al. | |
| 2020/0398894 A1 | 12/2020 | Hudecek et al. | |
| 2021/0163010 A1 | 6/2021 | Takabayashi et al. | |

OTHER PUBLICATIONS

Huang, S. et al., "Deep Learning Driven Visual Path Prediction from a Single Image," arXiv:1601.07265v1 [cs:CV] Jan. 2016.

Ahmen, S. et al., "Pedestrian and Cyclist Detection and Intent Estimation for Autonomous Vehicles: A Survey," Appl. Sci. 2019, 9, 2335, doi:10:3390/app9112335, www.mdpi.com/journal/applsci, , pp. 1-39.

Aryal, M., "Object Detection, Classification, and Tracking for Autonomous Vehicle," Masters Thesis, https://scholarworks.gvsu.edu/theses/912, 2018, pp. 1-46.

Min, "RNN-Based Path Prediction of Obstacle Vehicles with Deep Ensemble", IEEE Transactions on Vehicular Technology (2019), 68(10).

* cited by examiner

SYSTEMS AND METHODS FOR DETERMINING FUTURE INTENTIONS OF OBJECTS

BACKGROUND

Statement of the Technical Field

The present disclosure relates generally to computing systems. More particularly, the present disclosure relates to implementing systems and methods for determining future intentions of objects (which may, for example, be used for vehicle motion planning).

Description of the Related Art

Modern day vehicles have at least one on-board computer and have internet/satellite connectivity. The software running on these on-board computers monitor and/or control operations of the vehicles. If the vehicle is an autonomous vehicle, then it needs to be able to predict trajectories of agents in a scene in order to make safe and efficient behavior decisions.

SUMMARY

The present disclosure concerns implementing systems and methods for operating an autonomous vehicle. The methods comprise performing the following operations by a computing device: using sensor data to track an object that was detected in proximity to the autonomous vehicle; classifying the object into at least one dynamic state class of a plurality of dynamic state classes; determining, mapping or transforming the at least one dynamic state class into at least one goal class of a plurality of goal classes; determining, mapping or transforming the at least one goal class into at least one proposed future intention class of a plurality of proposed future intention classes; determining at least one predicted future intention of the object based on the proposed future intention class; and causing the autonomous vehicle to perform at least one autonomous driving operation based on the at least one predicted future intention determined for the object.

In some scenarios, a hierarchical probability tree is used to determine, map or transform the at least one dynamic state class into at least one goal class, and to determine, map or transform the at least one goal class into the at least one proposed future intention class. The dynamic state classes may include, but are not limited to, a parked vehicle class, a functionally stopped vehicle class, a lane blocking vehicle class, a queued vehicle class and/or a driving vehicle class. The goal classes may include, but are not limited to, a parked goal class, a lane blocking goal class and/or a follow nominal lane goal class. The proposed future intention classes may include, but are not limited to, a stop intention class, a cross intention class, a walk intention class, and/or a drive intention class.

In those or other scenarios, the proposed future intention is considered to be the predicted future intention. Alternatively, the predicted future intention is considered to be the proposed future intention when the proposed future intention has a probability value exceeding a threshold value, or is considered a proposed probability distribution over future intentions at a given cycle the predicted probability at the previous cycle. At least one next cycle of the classifying, determining/mapping/transforming and determining may be performed to obtain at least one next proposed future intention class for the object. A probability associated with the at least one proposed future intention class may be combined with a probability associated with the at least one next proposed future intention class to generate an aggregate probability for the at least one predicted future intentions. The autonomous vehicle may be caused to perform the autonomous driving operation based additionally on the dynamic state class, the goal class, a probability value associated with the proposed future intention class, a probability value associated with the predicted future intention, and/or an aggregate probability value associated with the predicted future intention or a distribution over predicted future intentions.

The implemented systems comprise: a processor; and a non-transitory computer-readable storage medium comprising programming instructions that are configured to cause the processor to implement the above described methods.

BRIEF DESCRIPTION OF THE DRAWINGS

The present solution will be described with reference to the following drawing figures, in which like numerals represent like items throughout the figures.

DETAILED DESCRIPTION

Figure 1:
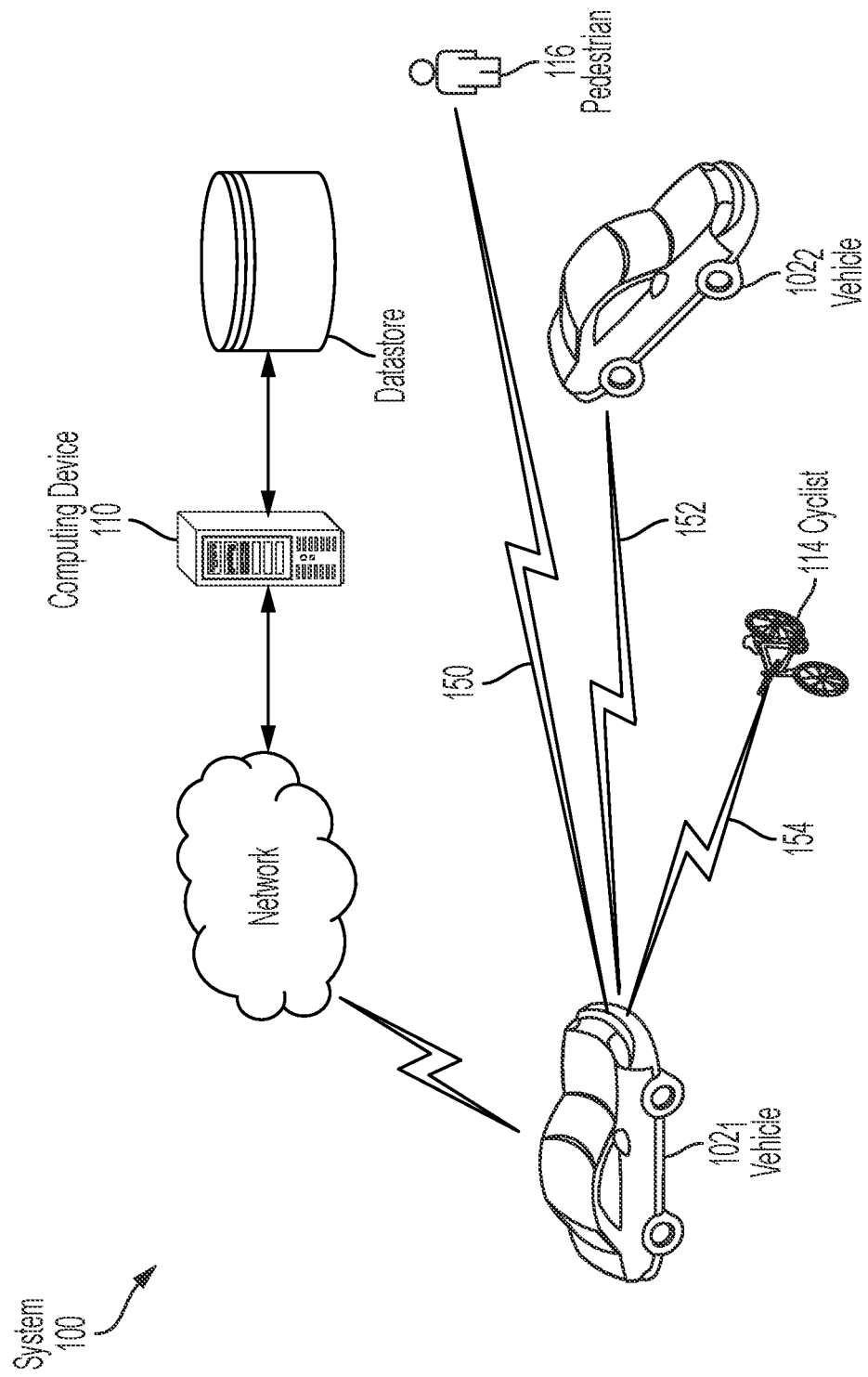
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An AV should be able to understand the state of the world and to predict the future states of the world for action planning and navigation. Geometrical predictions of objects' future trajectories are often not sufficient to determine how the AV should behave. This is especially the case for stationary vehicles. A vehicle could be stopped for many reasons such as parking or waiting at a red traffic light. Predicting that a vehicle is stationary does not help estimating how long it will stay stopped or what will happen after the reason for being stationary does not hold anymore. Understanding the reasons for a vehicle for being stationary can help the AV to better interpret the situation, foresee what will happen next and plan the appropriate navigation decisions.

In order to predict the behavior of actors in a scene, it is important to determine their future intentions. Knowing the intentions of actors (or detected objects) becomes particularly important for making long-term predictions. A long prediction horizon enables the AV to react to other actors ahead of time, thus increasing safety and on-board comfort. Intentions also enhance the interoperability of geometrical predictions, which can be exploited by the AV for making navigation decisions. However, inferring intentions of actors from sensory data is not straightforward as intentions are often not evident in a scene.

For increasing the interpretability of stationary predictions, the present solution infers a number of possible reasons for vehicles being stopped and integrates the same to estimate the vehicles' current goals. The present solution considers the following set of reasons for a vehicle being stationary that are relevant for understanding the situation and for selecting the appropriate actions to perform.

Is Parked: The vehicle is stopped at least partially out of a roadway and is not expected to move in a given period of time (e.g., 10 minutes).

Is Lane Blocking: The vehicle is stopped in a roadway for an extended period of time for reasons outside the normal flow of traffic (e.g., a stopped delivery truck, or a driver who is loading a vehicle (e.g., a taxi driver who is helping a passenger with luggage)).

Is Functionally Stopped: The vehicle is temporarily stopped in a roadway for reasons outside the normal flow of traffic (e.g., a taxi or bus picking up a passenger, a mail truck delivering mail, and/or a garbage truck picking up garbage).

Is Queued: The vehicle is temporarily stopped in a roadway due to the normal flow of traffic (e.g., a vehicle waiting at a red traffic light, stop sign or cross-walk, or a vehicle yielding to another vehicle on the roadway).

Note that, for pedestrians, similar dynamic states can be defined, for example, as jay-walking, cross-walking, following sidewalk, and/or loitering.

A collection of classifiers are used that infer a likelihood of each of the above-listed reasons for a vehicle being stationary. These reasons for being stationary are a subset of the possible dynamic state of actors. The outputs of the classifiers are integrated for defining a probability distribution over the possible stationary reasons that represent likelihoods relative to one another. This information is used for AV motion planning so as to enable explicit reasoning about stationary objects and incorporate the same into the AV's decision making process.

The reasons for a vehicle to be stationary are strongly connected with the vehicle's intent(s). Thus, the present solution uses the classifier outputs for also determining the current goal(s) of the vehicle. While a parked vehicle may be associated with a parked goal, a vehicle that is queued in traffic may be associated with a follow nominal lane goal. Each classifier can contribute to one or more goals. For example, a functionally stopped vehicle could be associated with a lane blocking goal and with a follow nominal lane goal when ready to merge back in the traffic. At the same time, one goal can incorporate information from multiple sources. For example, a lane blocking goal can integrate information from the lane blocking vehicle classifier and the functionally stopped vehicle classifier. Goals allow for further enhancing the interpretability of the predictions and offer motion planning additional context information for selecting the actions to perform.

A hierarchical process is employed by the present solution to predict future intentions of vehicles from semantic features that are inferred about the same from sensor data. The future intentions of a vehicle go beyond the prediction horizon and aim at covering the entire time of interaction with the AV. The future intention(s) of a vehicle is(are) estimated by abstracting the concept of goals as described above. Each goal is associated with at least one future intention. For example, a parked goal is associated with a stop intention, whereas a follow nominal lane goal is associated with a drive intention. This defines a bottom-up hierarchical structure that transforms semantic features from dynamic state classifiers into future intention estimates. Moreover, classifier likelihoods can be propagated through the hierarchy to determine the likelihood of each future intention. This may be achieved by first defining an observation model to update the goal likelihoods based on the classifier outputs. For example, a vehicle that is functionally stopped is mapped or transformed to a lane blocking goal with a probability P and to a follow nominal lane goal with a probability of 1-P. Similarly, the probabilities are propagated up to the future intention level so as to obtain a probability distribution over the possible intentions of an actor (e.g., a detected vehicle). Having an explicit representation of this probability distribution allows the AV to reason about the intentions of detected objects, and select the action to perform without requiring awareness of the classifier outputs. This hierarchical approach improves forecasting in the presence of ambiguity between the outputs of the classifiers (e.g., between a parked vehicle and a functionally stopped vehicle), and allows for representing smooth transitions between future intentions of an actor (e.g., detected vehicle).

The above described solution has many advantages. For example, the present solution allows for explicit reasoning about future intentions of actors and their associated probabilities, which facilitates decision making without requiring forecasting to be built on individual goals or merge them heuristically. The present solution also employs an additional layer for abstraction that allows for reasoning about intentions without exposing the reasons for that actor to be stationary to the decision-making process. This makes the interface between prediction and motion planning simple and more maintainable, which may increase the development speed as the classifiers can be modified without entailing architectural changes in motion planning. Furthermore, the present solution enables the computation of probabilities in a hierarchical fashion. This hierarchical process ensures the consistency of probabilities making them a suitable input for probabilistic forecasting and motion planning.

The present solution is being described herein in the context of an autonomous vehicle. The present solution is not limited to autonomous vehicle applications. The present solution can be used in other applications such as robotic application, Artificial Intelligence (AI) applications, metric applications, and/or system performance applications.

Illustrative Systems

Referring now to FIG. 1, there is provided an illustration of an illustrative system 100. System 100 comprises a vehicle $102_1$ that is traveling along a road in a semi-autonomous or autonomous manner. Vehicle $102_1$ may be an AV. The AV $102_1$ can include, but is not limited to, a land vehicle (as shown in FIG. 1), an aircraft, or a watercraft.

AV $102_1$ is generally configured to detect objects $102_2$, 114, 116 in proximity thereto. The objects can include, but are not limited to, a vehicle $102_2$, a cyclist 114 (such as a rider of a bicycle, electric scooter, motorcycle, or the like) and/or a pedestrian 116. This object detection can be made, for example, by analyzing sensor data generated by at least one sensor device on the AV $102_1$ and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle an any entity that may affect, or may be affected by, the vehicle. The information can include, but is not limited to, information specifying actions or operations have been performed, being performed and/or are to be performed by the object.

When such a detection is made, AV $102_1$ performs operations to: generate one or more possible object trajectories for the detected object; determine one or more dynamic state classifications, goals and/or future intentions for the detection object; and use the at least one of the generated possible object trajectories, dynamic state classifications, goals and future intentions to facilitate a determination of a vehicle trajectory. The AV $102_1$ may then perform operations to follow the vehicle trajectory.

In some scenarios, the AV $102_1$ performs additional operations to determine whether or not there is an undesirable level of risk that a collision will occur between the AV and object in a threshold period of time (e.g., 1 minute). If so, the AV $102_1$ performs operations to determine whether the collision can be avoided if the vehicle trajectory is followed by the AV $102_1$ and any one of a plurality of dynamically generated emergency maneuvers is performed in pre-defined time period (e.g., N milliseconds). If the collision can be avoided, then the AV $102_1$ takes no action or optionally performs a cautious maneuver (e.g., mildly slows down). In contrast, if the collision cannot be avoided, then the AV $102_1$ immediately takes an emergency maneuver (e.g., brakes and/or changes direction of travel).

Figure 2:
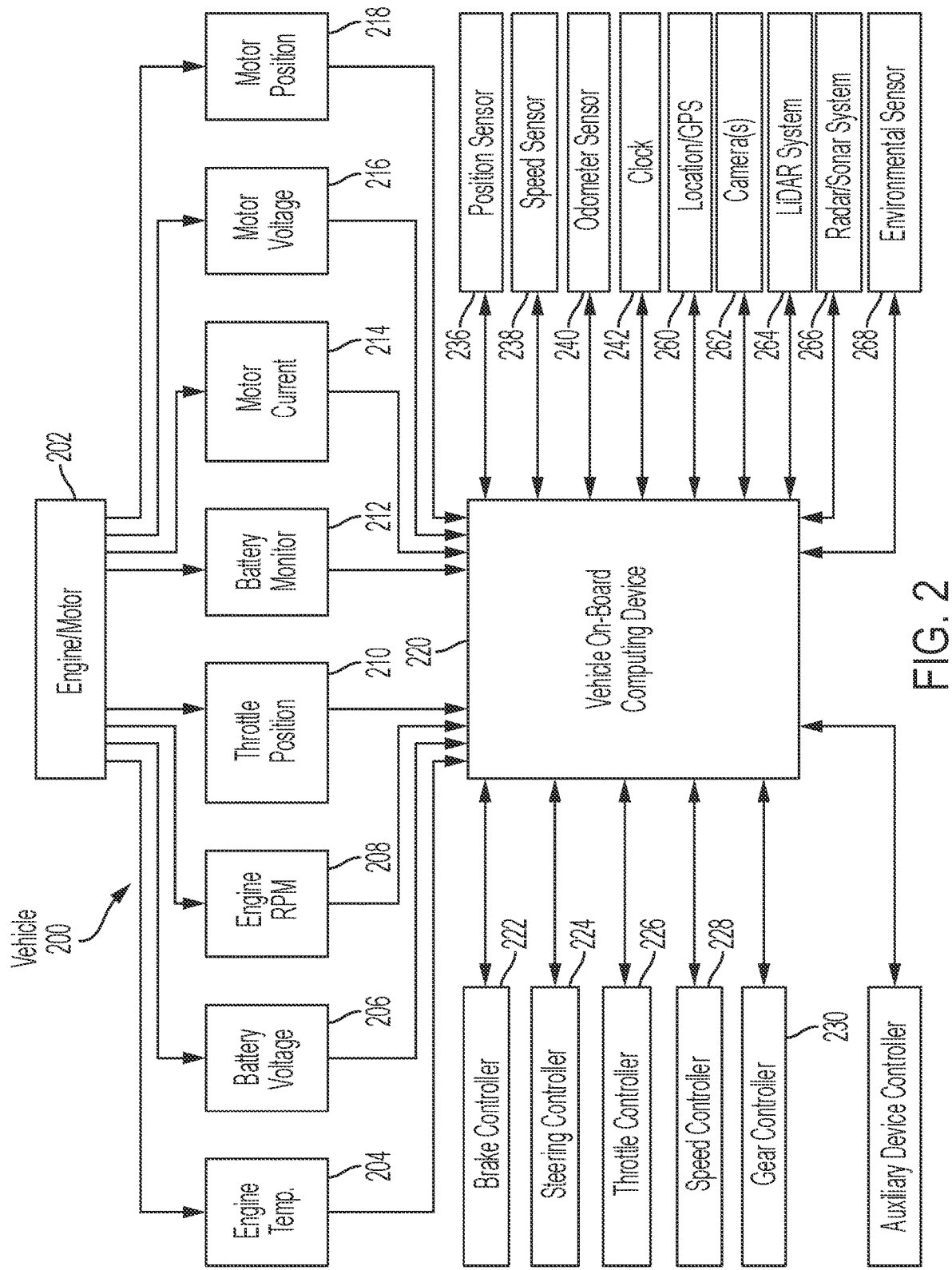
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

LiDAR information is communicated from LiDAR sensor 264 to the on-board computing device 220. Additionally, captured images are communicated from the camera(s) 262 to the on-board computing device 220. The LiDAR information and/or captured images are processed by the on-board computing device 220 to detect objects in proximity to the vehicle 200.

When the on-board computing device 220 detects a moving object, the on-board computing device 220 will generate one or more possible object trajectories for the detected object, and analyze the possible object trajectories to assess the risk of a collision between the object and the AV. If the risk exceeds an acceptable threshold, the on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the on-board computing device 220 may cause the vehicle 200 to perform a cautious maneuver (e.g., mildly slow down, accelerate, or swerve). In contrast, if the collision cannot be avoided, then the on-board computing device 220 will cause the vehicle 200 to take an emergency maneuver (e.g., brake and/or change direction of travel).

Figure 3:
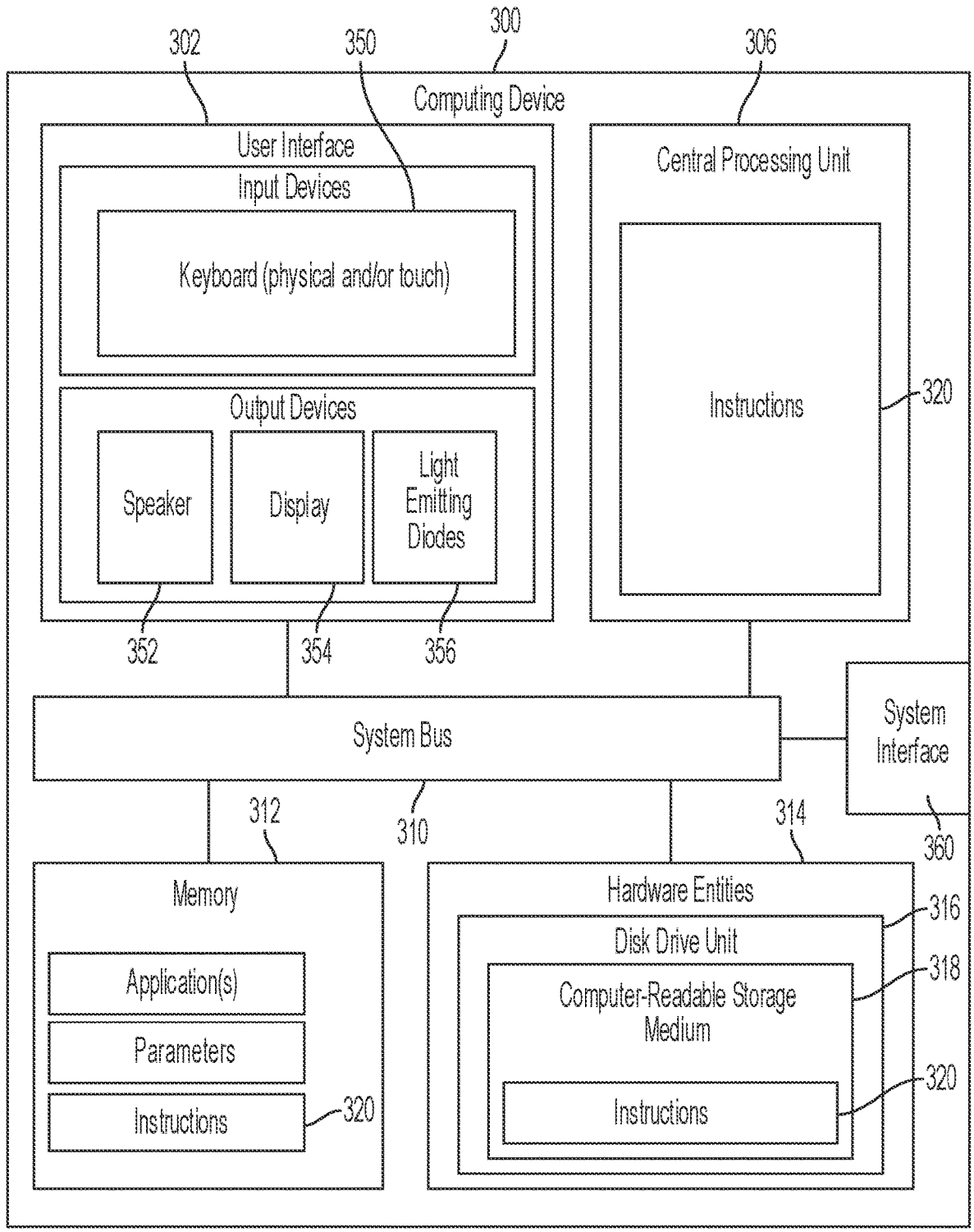
FIG. 3 is an illustration of an illustrative computing device.

Referring now to FIG. 3, there is provided an illustration of an illustrative architecture for a computing device 300. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit (CPU) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
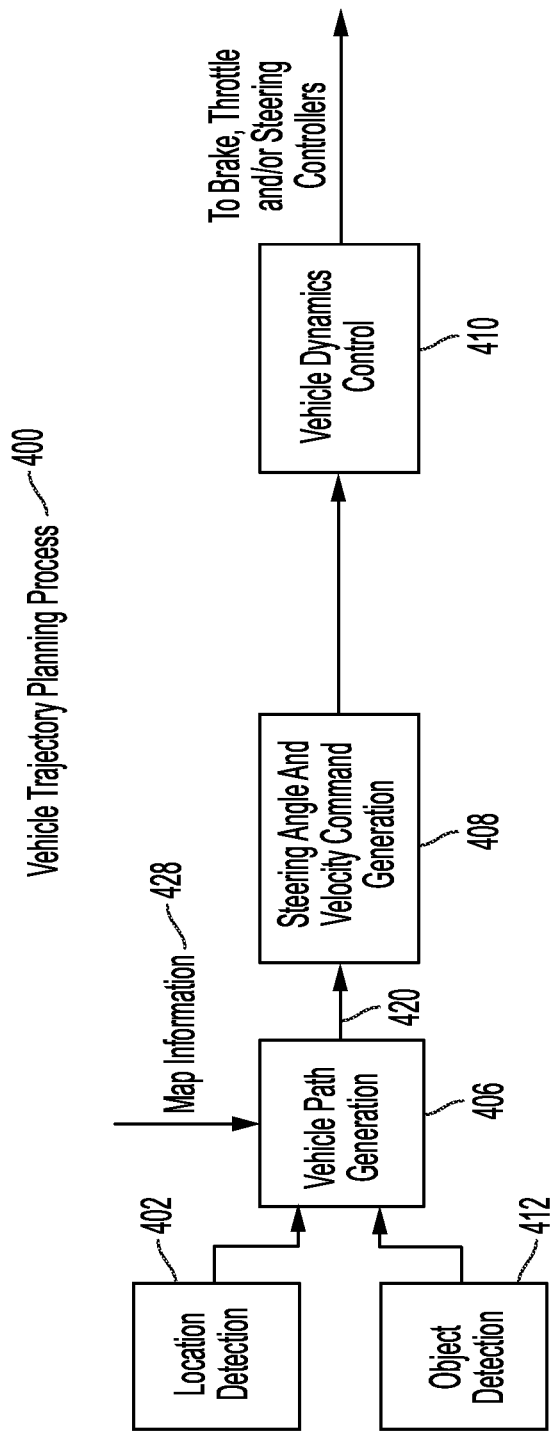
FIG. 4 provides a block diagram that is useful for understanding how vehicle control is achieved in accordance with the present solution.

Referring now to FIG. 4, there is provided a block diagram that is useful for understanding how vehicle control is achieved in accordance with the present solution. All of the operations performed in blocks 402-410 can be performed by the on-board computing device of a vehicle (e.g., AV 102₁ of FIG. 1).

In block 402, a location of the vehicle is detected. This detection can be made based on sensor data output from a location sensor (e.g., location sensor 260 of FIG. 2) of the vehicle. This sensor data can include, but is not limited to, GPS data. The detected location of the vehicle is then passed to block 406.

In block 404, an object is detected within proximity of the vehicle. This detection is made based on sensor data output from a camera (e.g., camera 262 of FIG. 2), a LiDAR system (e.g., LiDAR system 264 of FIG. 2), and/or a radar/sonar system 264 of the vehicle. Techniques for detecting objects are well known in the art. Any known or to be known object detection technique can be used herein. Information 412 about the detected object is passed to block 406. This information 412 includes, but is not limited to, a track (or spatial description) of the detected object. The track (or spatial description) may comprise at least one predicted trajectory or path of travel of the object, a speed of the object, a full extent of the object, a heading of the object, a direction of travel of the object, classification(s) of the object, goal(s) of the object, and/or predicted future intention(s) of the object. The predicted object trajectory or path of travel can include, but is not limited to, a linear path pointing in the direction of a lane or a curved path pointing in the direction of a lane.

This object detection information 412 output from block 404 can be subsequently used to facilitate at least one autonomous driving operation (e.g., object tracking operations, object trajectory prediction operations, vehicle trajectory determination operations, and/or collision avoidance operations). For example, the object's current location, predicted object trajectory, and predicted future intentions for the object can be used to determine a vehicle trajectory in block 406, and/or trigger cautious or emergency maneuvers in block 406. The present solution is not limited to the particulars of this example.

In block 406, a vehicle trajectory is generated using the information from blocks 402 and 404. Techniques for determining a vehicle trajectory are well known in the art. Any known or to be known technique for determining a vehicle trajectory can be used herein without limitation. For example, in some scenarios, such a technique involves determining a trajectory for the AV that would pass the object when the object is in front of the AV, the object has a heading direction that is aligned with the direction in which the AV is moving, the object is classified as a functionally stopped vehicle, the object is associated with a lane blocking goal, and the object has a predicted future stop intention. The present solution is not limited to the particulars of this scenario. The vehicle trajectory 420 can be determined based on the location information from block 402, the object detection information from block 404, and map information 428 (which is pre-stored in a data store of the vehicle). The vehicle trajectory 420 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 420 is then provided to block 408.

In block 408, a steering angle and velocity command is generated based on the vehicle trajectory 420. The steering angle and velocity command is provided to block 410 for vehicle dynamics control.

Vehicle Control

Referring now to FIG. 5, there is provided a flow diagram of an illustrative method 500 for controlling a vehicle (e.g., vehicle $102_1$ of FIG. 1). At least a portion of method 500 is performed by a vehicle on-board computing device (e.g., vehicle on-board computing device 220 of FIG. 2). Method 500 is performed for each object (e.g., vehicle $102_2$ of FIG. 1, cyclist 114 of FIG. 1, and/or pedestrian 116 of FIG. 1) that has been detected to be within a distance range from the vehicle at any given time.

Method 500 comprises a plurality of operations 502-530. The present solution is not limited to the particular order of operations 502-530 shown in FIG. 5. For example, the operations of 520 can be performed in parallel with the operations of 504-518, rather than subsequent to as shown in FIG. 5.

Figure 5A:
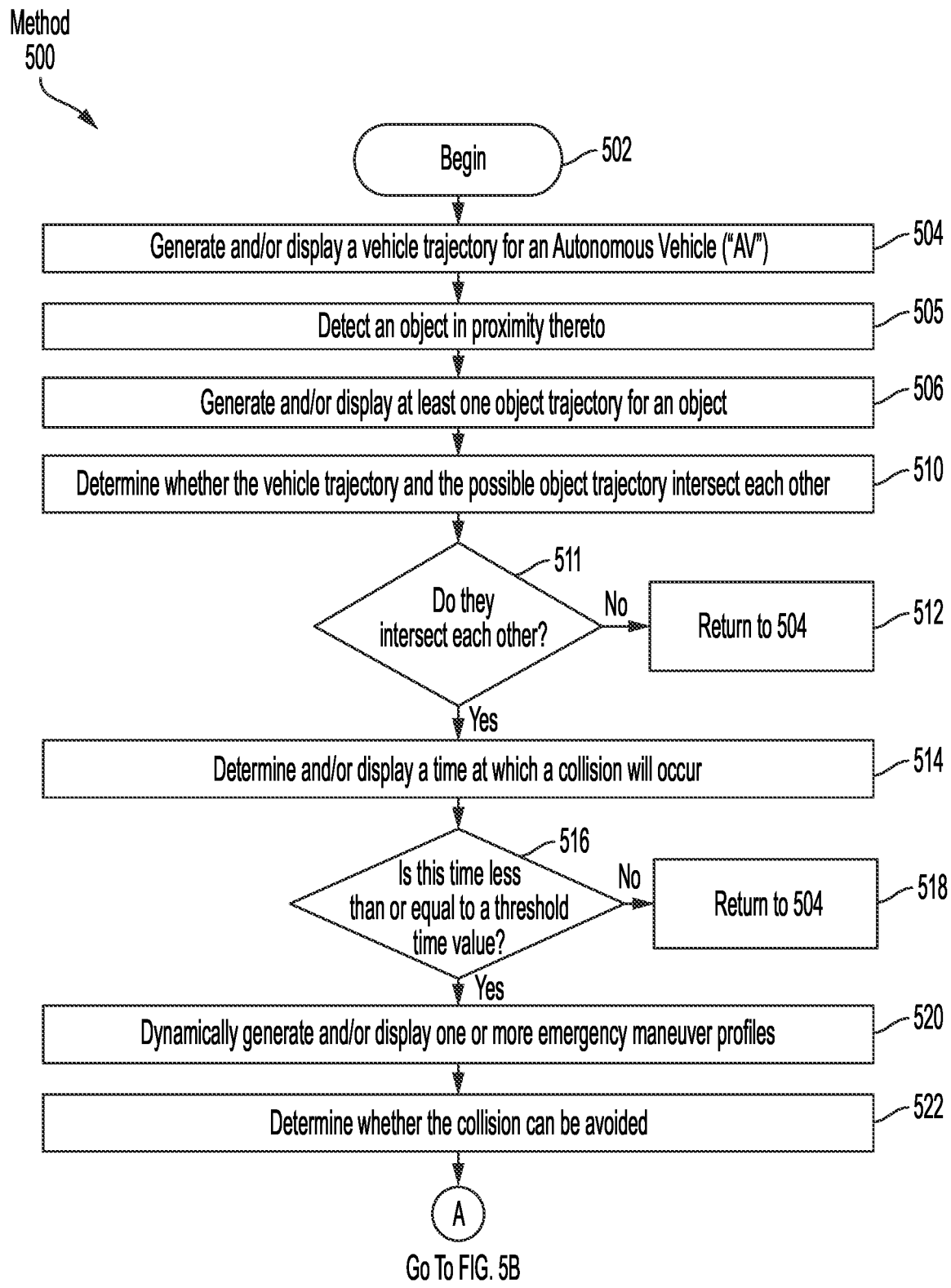
FIGS. 5A-5B (collectively referred to herein as "FIG. 5") provide a flow diagram of an illustrative method for controlling an autonomous vehicle using LiDAR decorrelation.

As shown in FIG. 5A, method 500 begins with 502 and continues with 504 where a vehicle trajectory (e.g., vehicle trajectory 420 of FIG. 4) for an AV is generated. The vehicle trajectory may represent a smooth path that does not have abrupt changes that would otherwise provide passenger discomfort, or may repent an emergency maneuver to avoid a collision. Techniques for determining a vehicle trajectory are well known in the art. Any known or to be known technique for determining a vehicle trajectory can be used herein without limitation. In some scenarios, the vehicle trajectory is determined based on location information generated by a location sensor (e.g., location sensor 260 of FIG. 2) of the AV, object detection information generated by the on-board computing device (e.g., on-board computing device 220 of FIG. 2) of the AV, images captured by at least one camera (e.g., camera 262 of FIG. 2) of the AV, map information stored in a memory (e.g., memory 412 of FIG. 4) of the AV, and/or lane information.

Once the vehicle trajectory is generated, method 500 continues with 505 where the AV performs operations to detect an object that is in proximity thereto. Object detection algorithms are well known in the art. Any known or to be known object detection algorithm can be used here. The object detection is then used to facilitate at least one autonomous driving operation (e.g., object tracking operations, object trajectory prediction operations, vehicle trajectory determination operations, and/or collision avoidance operations).

Accordingly, method 500 continues with 506 where one or more possible object trajectories (e.g., possible object trajectories 412 of FIG. 4) are determined for the object (e.g., vehicle $102_2$, cyclist 114 or pedestrian 116 of FIG. 1) detected in 505. Techniques for determining trajectories for detected objects are well known. In some scenarios, sensor data is used to determine the object trajectories. Other information may be alternatively or additionally used to determine the object trajectories. This other information can include, but is not limited to, information received from a communication device (e.g., a transceiver, a beacon and/or a smart phone) of the object via wireless communication link(s) (e.g., link(s) 150, 152, 154 of FIG. 1). This information can specify actions or operations that have been performed, are being performed and/or are going to be performed by the object. (e.g., turn right/left, change lanes, accelerate/decelerate, a path of travel, etc.).

Next in 510, a determination is made as to whether the vehicle trajectory generated in 504 and the possible object trajectory generated in 506 intersect each other. If they do not intersect each other [511: NO], then 512 is performed where method 500 returns to 504.

In contrast, if they do intersect each other [511: YES], then method 500 continues to 514 where a time value is determined. This time value represents a time at which a collision will occur if the vehicle trajectory is followed by the AV and the possible object trajectory of travel is followed by the object (e.g., which has been classified as a driving vehicle and has a drive intention). The time value determined in 514 is then compared to a threshold time value, as shown by 516. The threshold time value is selected in accordance with a given application (e.g., one or more seconds). If the time value is greater than the threshold time value [516: NO], then 518 is performed where method 500 returns to 504. If the time value is equal to or less than the threshold time value [516: YES], then method 500 continues with 520-522. 520-522 involve: dynamically generating one or more emergency maneuver profiles based on the vehicle trajectory and the possible object trajectory/predicted path of travel; and determine whether the collision can be avoided if the vehicle trajectory is followed by the AV and any one of the emergency maneuvers is performed in a pre-defined time period (e.g., N milliseconds). Upon completing 522, method 500 continues with 524 of FIG. 5B.

Figure 5B:
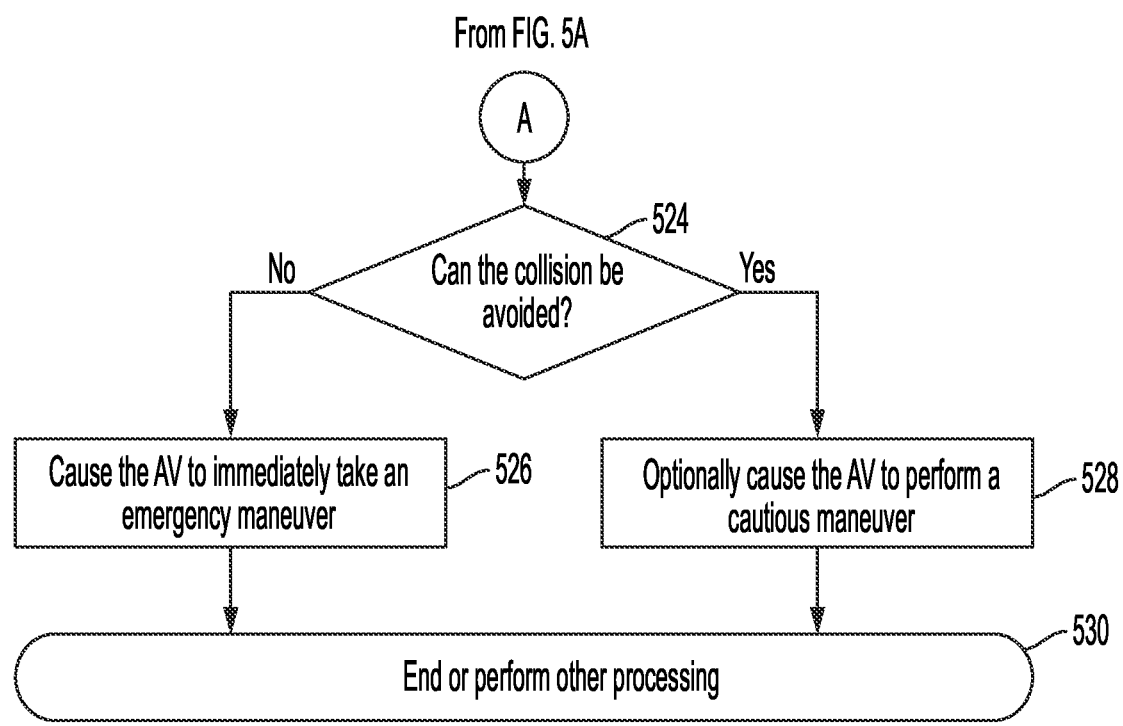

Referring now to FIG. 5B, if the collision cannot be avoided in the pre-defined time period [524: NO], then 526 is performed where the AV is caused to immediately take an emergency maneuver. The emergency maneuver can include, but is not limited to, one of the dynamically generated emergency maneuvers discussed above in relation to 520. Techniques for causing an AV to take emergency maneuvers are well known in the art. Any known or to be known technique for causing an AV to take emergency maneuvers can be used here. Subsequently, 530 is performed where method 500 ends or other processing is performed.

In contrast, if the collision can be avoided in the pre-defined time period [524: YES], then 528 is performed where the AV is optionally caused to perform a cautious maneuver (e.g., mildly slow down). Techniques for causing an AV to take a cautious maneuver such as slowing down are well known in the art. Any known or to be known technique for causing an AV to take a cautious maneuver can be used here. Subsequently, 530 is performed where method 500 ends or other processing is performed.

Figure 6:
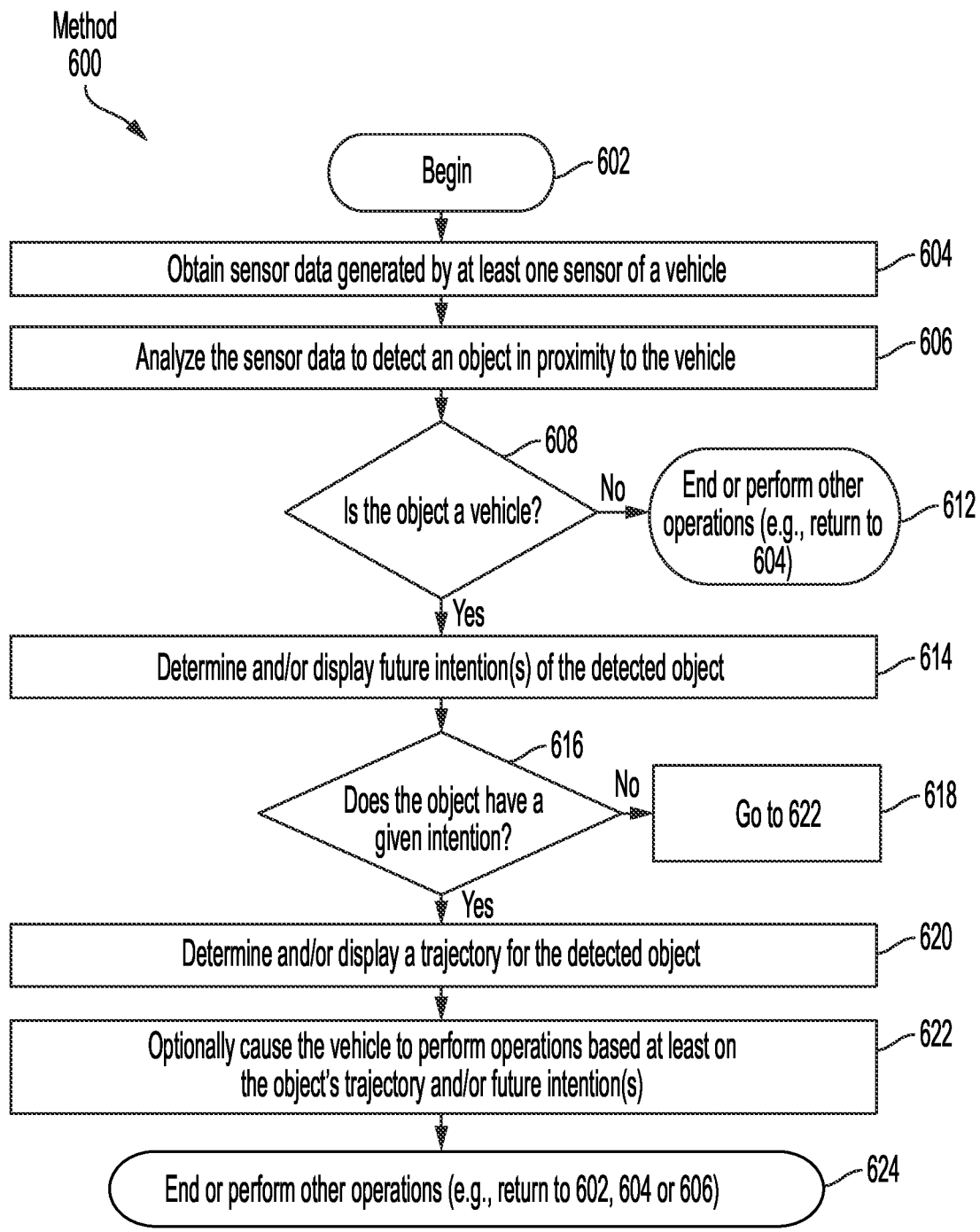
FIG. 6 provides a flow diagram of an illustrative method for Autonomous Vehicle (AV) motion planning using a predicted trajectory for a detected object.

The above described method 500 does cover scenarios where the detected object is a parked vehicle, a functionally stopped vehicle, a lane blocking vehicle, a queued vehicle and/or a driving vehicle. However, generating stationary trajectory predictions for vehicles that are currently stopped might not be sufficient to determine how the world will evolve, and thus how the AV should behave. Inferring possible reasons for a vehicle being stopped makes stationary predictions more interpretable. Reasoning about the stationary reasons helps estimate how long a vehicle will stay stopped as well as what could happen after a reason does not hold anymore. The present solution infers and exposes this information to motion planning by representing the probability distribution over the possible stationary reasons as well as their associated goals and likelihoods. The AV can exploit this information for planning navigation operations of the AV. For example, when the AV is behind a stationary vehicle such information can help with interpreting the situation, deciding whether to pass or queue behind the stationary vehicle, or deciding whether the AV needs to acquire more information to make a decision whether to pass or queue behind the stationary vehicle. Thus, another method 600 is shown in FIG. 6 which considers reasons that a vehicle is stationary to make AV motion planning decisions. Method 600 can be performed by the vehicle $102_1$ of FIG. 1, computing device 110 of FIG. 1, vehicle on-board computing device 220 of FIG. 2, and/or computing device 300 of FIG. 3.

As shown in FIG. 6, method 600 comprises operations 602-624. The operations of blocks 604-606 can be performed in block 505 of FIG. 5. The operations of blocks 608-620 can be performed in block 506 of FIG. 5. The operations of block 622 can include, but is not limited to, the operations of blocks 510-528 of FIG. 5.

Method 600 begins with 602 and continues with 604 where the computing device obtains sensor data generated by at least one sensor of a vehicle (e.g., vehicle $102_1$ of FIG. 1). The sensor data can include, but is not limited to, images captured by a camera (e.g., camera 262 of FIG. 2) of the vehicle, LiDAR data generated by a LiDAR system (e.g., LiDAR system 264 of FIG. 2) of the vehicle, and/or sensor data generated by a radar/sonar system (e.g., radar/sonar system 266 of FIG. 2) of the vehicle.

The sensor data is analyzed by the computing device in 606 to detect an object in proximity to the vehicle. Algorithms for object detection are well known in the art. An illustrative object detection algorithm that can be employed here is the well-known Convolutional Neural Network (CNN) based object detection algorithm). The operations performed in 606 can also involve: determining a type of object (e.g., vehicle (e.g., a bus, a taxi, a garbage truck, a mail truck, a delivery truck, etc.), pedestrian or a cyclist), a bounding box for the detected object, a current location of the detected object, a distance of the detected object from the vehicle, and a direction of the detected object relative to the vehicle. The current location of the detected object is defined by an x-coordinate, a y-coordinate and a z-coordinate.

Once an object has been detected, the computing device performs operations in 608 to determine whether the object is a vehicle. If the object is not a vehicle [608: NO], then 612 is performed where method 600 ends or other operations are performed (e.g., return to 604). If the object is a vehicle [608: YES], then 614 is performed where a future intention of the detected object is determined and/or displayed (e.g., on display 354 of FIG. 3). The manner in which the future intention is determined will become evident as the discussion progresses. If the object does not have a given intention (e.g., a driving intention) with a given certainty (e.g., a certainty above a threshold) [616: NO], then method 600 continues to 622, as shown by 618.

If the object has the given intention (e.g., a driving intention) with a given certainty (e.g., a certainty above a threshold) [616: YES], then a trajectory for the object is determined and/or displayed (e.g., on display 354 of FIG. 3) in 620. The manner in which the object's trajectory is determined will become evident as the discussion progresses. In 622, a vehicle (e.g., AV $102_1$ of FIG. 1) is optionally caused to perform operations based on the object's trajectory and/or the object's future intention. Subsequently, 624 is performed where method 600 ends or other operations are performed (e.g., return to 602, 604 or 606).

Figure 7:
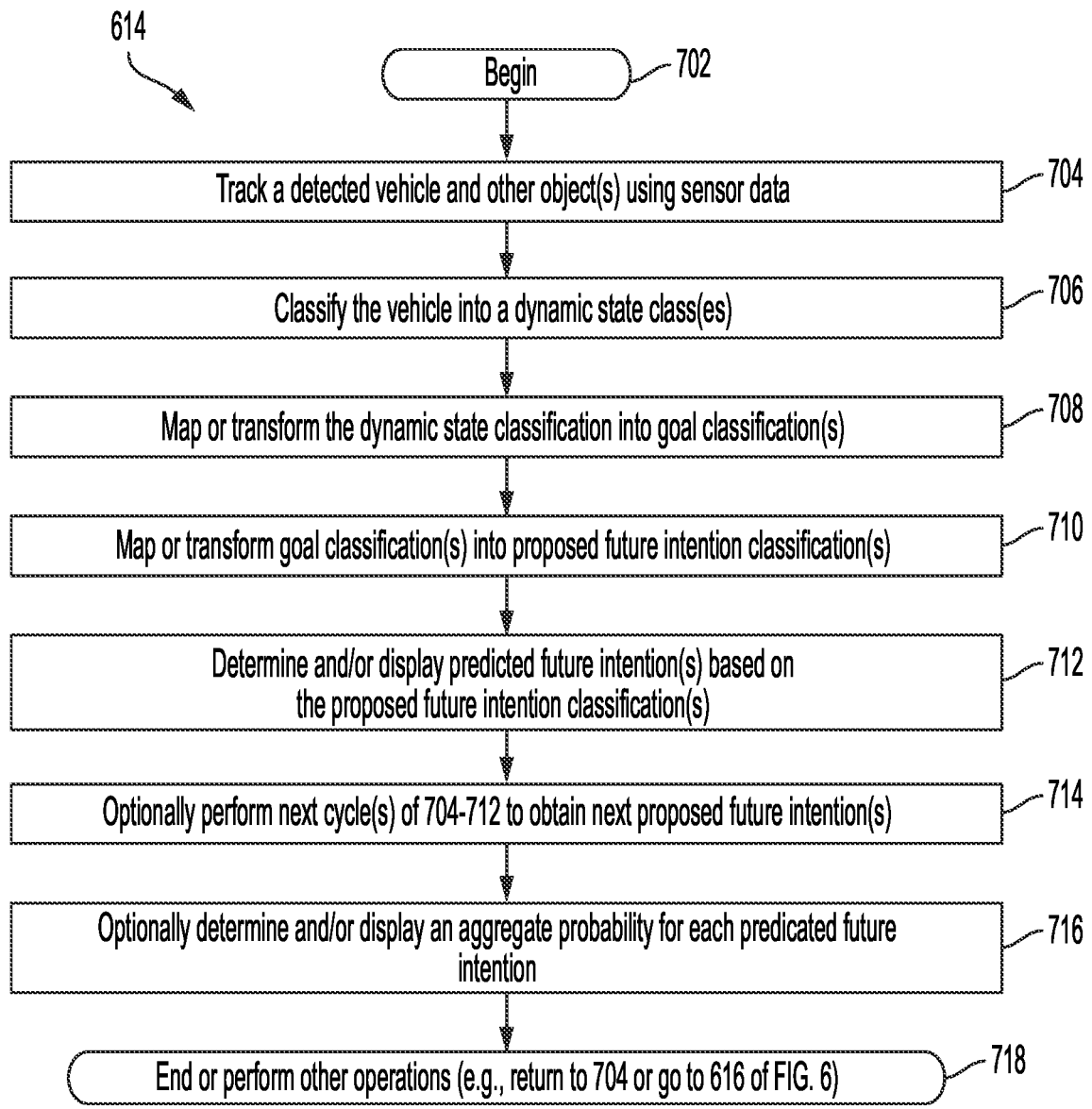
FIG. 7 provides a flow diagram of an illustrative method for determining future intention for a detected object.

Referring now to FIG. 7, there is provided a more detailed flow diagram of the operations performed in block 614 of FIG. 6. The operations begin with 702 and continue with 704 where a detected vehicle (e.g., vehicle $102_2$ of FIG. 1) and other objects are tracked using sensor data. For example, the vehicle may be tracked from image to image and/or from point cloud to point cloud. This tracking provides a temporal sequence of locations and positions for the vehicle that specify states, characteristics and/or expectations of the vehicle. For example, the most recent location and position of the vehicle may be projected into a 3D road map to determine whether the vehicle currently resides in/out of a roadway and to determine an extent the vehicle resides in/out of the roadway.

The temporal sequence of locations and positions for the vehicle may be used in 706 to determine whether the vehicle is stationary or moving, and to determine whether the vehicle is stationary due to the normal flow of traffic (e.g., stopped at red light or stop sign) or for reasons outside the normal flow of traffic (e.g., allowing a pedestrian to cross the roadway, picking up passengers, or delivering items to a recipient).

If stationary, then a determination can be made as to whether the vehicle is expected to move in a given period of time (e.g, 5-10 minutes in general for the time of interaction with the AV). This determination can be made, for example, based on: whether the vehicle is currently parked in a parking lot, parked in a parking spot adjacent to the roadway or parked on the side of the roadway (e.g., as indicated by the 3D road map, contents of the sensor data and/or other information received from communication device(s) of the object); how much time the vehicle has been stationary in the roadway (e.g., as indicated by the 3D road map, contents of the sensor data and/or other information received from communication device(s) of the object); and/or whether any individual(s) is(are) currently located adjacent to or traveling towards the vehicle (e.g., as indicated by contents of the sensor data and/or other information received from communication device(s) of the object). For example, a determination can be made that a stationary vehicle is not expected to move within the given period of time when (i) the vehicle is parked in a parking lot, a parking spot or on the side of the roadway and (ii) no individual is detected in proximity to, traveling towards or sitting in the parked vehicle. A determination can be made that the stationary vehicle is expected to move within the given period of time when: (i) the vehicle is parked in a parking lot/parking space/side of roadway and (ii) at least one individual is detected in proximity to or traveling towards the parked vehicle; or when a taxi is dropping off a passenger. The present solution is not limited to the particulars of this example.

In 706, classifiers are employed to classify the vehicle into one of a plurality of dynamic state classes. The classifiers can include, but are not limited to, a parked vehicle classifier configured to classify vehicles as parked vehicles, a functionally stopped vehicle classifier configured to classify vehicles as functionally stopped vehicles, a lane blocking classifier configured to classify vehicles as lane blocking vehicles, a queued vehicle classifier configured to classify vehicles as queued vehicles, and/or a driving vehicle classifier configured to classify vehicles as driving vehicles. Thus, the dynamic state classes can include, but are not limited to, a parked vehicle class, a functionally stopped vehicle class, a lane blocking vehicle class, a queued vehicle class, and/or a driving vehicle class. A parked vehicle may be defined as a vehicle that is stopped at least partially out of a roadway and is not expected to move in a given period of time (e.g., 10 minutes). A functionally stopped vehicle may be defined as a vehicle that is temporarily stopped in a roadway for reasons outside the normal flow of traffic (e.g., a taxi or bus picking up a passenger, a mail truck delivering mail, and/or a garbage truck picking up garbage). A lane blocking vehicle may be defined as a vehicle that is stopped in a roadway for an extended period of time for reasons outside the normal flow of traffic (e.g., a stopped delivery truck, or a driver who is loading a vehicle (e.g., a taxi driver who is helping a passenger with luggage)). A queued vehicle may be defined as a vehicle that is temporarily stopped in a roadway due to the normal flow of traffic (e.g., a vehicle waiting at a red traffic light, stop sign or cross-walk, or a vehicle yielding to another vehicle on the roadway). A driving vehicle may be defined as a vehicle that is moving in a roadway.

Once the vehicle has been classified into a dynamic state class, a hierarchical probability tree is used to transform or map the dynamic state class (e.g., a parked vehicle, a functionally stopped vehicle, a queued vehicle, or a driving vehicle) into at least one goal class of a plurality of goal classes with a given probability $P_{Goal}$. The probability $P_{Goal}$ may be predefined by each type of goal, or alternatively dynamically determined during the method. The probability $P_{Goal}$ may be defined in accordance with the following Bayesian mathematical function (1).

$$P'_{Goal} = p(x') = \eta \cdot p(z|x) \cdot p(x) \quad (1)$$

with $p(z|x) = \Pi_i p(z_i|x)$, where $p(z_i|x)$ is the observation model for the output of one dynamic state classifier $z_i$ conditioned on the goal x, and p(x) is the goal probability at the previous cycle. The probability $P_{Goal}$ may be the same or different for two or more of the goal classes. For example, the probability $P_{Goal-1}$ is assigned to the first goal class, while the probability $P_{Goal-2}$ assigned to the second goal class, where $P_{Goal-2} = P_{Goal-1}$ or $P_{Goal-2} \neq P_{Goal-1}$. It should also be noted that the probability $P_{Goal}$ associated with each goal class can be the same or different in each cycle of the method.

Figure 8:
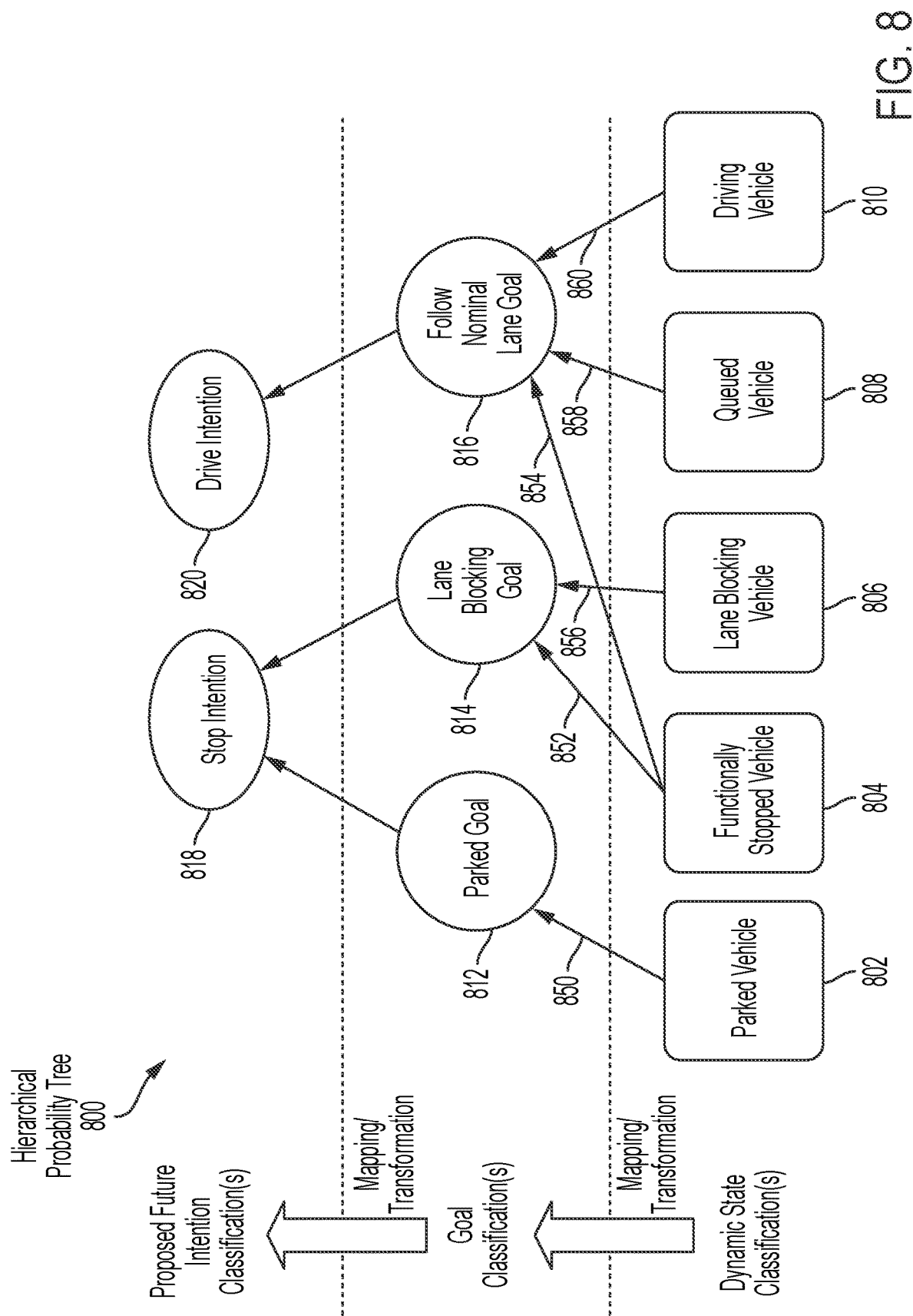
FIG. 8 is an illustration of an illustrative hierarchical probability tree.

An illustrative hierarchical probability tree 800 is shown in FIG. 8. The hierarchical probability tree 800 comprises intermediary nodes 812, 814, 816 for a plurality of goal classes. The goal classes may include, but are not limited to, a parked goal as shown by node 812, a lane blocking goal as shown by node 814, and/or a follow nominal lane goal as shown by node 816. The parked goal may be defined as a goal to bring a vehicle to a halt and leave it temporarily at a given location (e.g., in a parking lot or by the side of a roadway) without an expectation to move in a given period of time (e.g., 10 minutes). The lane blocking goal may be defined as a goal to at least partially stop and remain stationary in a lane of a roadway for an extended period of time (e.g., so as to prevent traffic from passing through or along a roadway). The follow nominal lane goal 816 may be defined as a goal to travel in a lane of a roadway.

The intermediary nodes 812, 814, 816 are associated with dynamic state classification nodes 802, 804, 806, 808, 810 as shown by arrows 850-860. These associations between the expert classification nodes 802-810 and the goal classification nodes 812-816 define how the dynamic state classes contribute to or are transformed/mapped into goal classes via the hierarchical probability tree 800. For example, the parked vehicle class of node 802 contributes to or is transformed/mapped into the parked goal class of node 812, as shown by arrow 850. The functionally stopped vehicle class of node 804 contributed to or is transformed/mapped into the lane blocking goal of node 814 (e.g., when passengers are being loaded into the vehicle) as shown by arrow 852 and/or the follow nominal lane goal class of node 816 (e.g., when the vehicle is ready to merge back into traffic on the roadway) as shown by arrow 854. The lane blocking vehicle class of node 806 contributes to or is transformed/mapped into the lane blocking goal of node 814, as shown by arrow 856. Notably, the lane blocking goal of node 814 integrates information from two dynamic state classes, namely the functionally stopped vehicle class and the lane blocking vehicle class. The present solution is not limited in this regard, a goal classification node can incorporate information from any number of dynamic state classes in accordance with a given application. The queued vehicle class of node 808 contributes to or is transformed/mapped into the follow nominal lane goal class of node 816, as shown by arrow 858. The driving vehicle class of node 810 contributed to or is transformed/mapped into the following nominal lane goal class of node 816, as shown by arrow 860.

Referring again to FIG. 7, the method continues with 710 where the hierarchical decision tree is used to transform or map the goal classification(s) into proposed future intention classification(s) with a given probability $P_{intention}$. The probability $P_{intention}$ may be predefined by each future intention class, or alternatively dynamically determined during the method. The probability $P_{intention}$ may be defined by the following Bayesian mathematical equation (2).

$$P'_{Intention} = p(u') = \eta \cdot p(x|u) \cdot p(u) \quad (2)$$

with $p(x|u) = \Pi_i\, p(x_i|u)$,
where $p(x_i|u)$ is the observation model for likelihood of goal conditioned on the intention u, and p(u) is the intention probability at the previous cycle. The probability $P_{intention}$ may be the same or different for two or more of the future intention classes. For example, the probability $P_{intention-1}$ is assigned to a first intention class, while the probability $P_{intention-2}$ is assigned to a second intention class. $P_{intention-2}$ is different than $P_{intention-1}$. The present solution is not limited to the particulars of this example. It should also be noted that the probability $P_{intention}$ associated with each proposed future intention class can be the same or different in each cycle of the method.

As noted above, an illustrative hierarchical probability tree 800 is shown in FIG. 8. The hierarchical probability tree 800 comprises root nodes 818, 820 for proposed future intention classifications. The hierarchical information is propagated from the bottom nodes 802-810 to the root nodes 818-820. So the root nodes 818-820 are not the original source of information, but rather comprise the last derived layer of the hierarchical probability tree 800. The proposed future intention classes include, but are not limited to, a stop intention class a cross intention class, a walk intention class, or a driving intention class. A stop intention may be defined as an intention to remain stationary for a given period of time (e.g., 3-10 minutes, for example, for parked cars). A drive intention is defined as an intention to travel along a roadway and without an expectation to stop traveling for a given period of time (e.g., 3-10 minutes). It should be noted that the drive intention is not necessarily associated with vehicles that are currently driving (e.g., a bus merging back into traffic may have a likely drive intention).

Once the proposed future intention(s) for the vehicle have been obtained using the hierarchical probability tree, the method continues with determining predicted future intention(s) for the vehicle, as shown by 712 of FIG. 7. The predicted future intention(s) may be displayed (e.g., on display 354 of FIG. 3) in 712. In some scenarios, the system considers the proposed future intention(s) as the predicted future intention(s). In other scenarios, the system considers the predicted future intention(s) as only the proposed future intention(s) having probability value(s) exceeding given threshold(s) $thr_{FI}$. The threshold(s) $thr_{FI}$ may be predefined threshold(s) and selected in accordance with a given application. The same or different threshold $thr_{FI}$ may be used for two or more different proposed future intentions.

Next in 714, at least one next cycle of 704-712 is optionally performed to obtain next proposed future intention(s) for the vehicle with associated probability value(s) $P_{intention}$. In 716, the system determines and/or displays (e.g., on display 354 of FIG. 3) an aggregate probability for each predicted future intention. The aggregate probability may include, but is not limited to, a Bayesian update across a plurality of probability values determined in a plurality of cycles of 704-712.

Subsequently, 718 is performed where the method ends or other operations are performed. For example, the method may return to 704. Alternatively, the method may go to 616 of FIG. 6 so that motion and/or trajectory operations for the AV (e.g., AV $102_1$ of FIG. 1) are performed based on the dynamic state classification(s) (e.g., the classification(s) of node(s) 802-810 of FIG. 8), the goal classification(s) (e.g., the goal classification(s) of node(s) 812-816 of FIG. 8), the predicted future intention(s), the probability value(s) (i.e., $P_{Goal}$ and/or $P_{intention}$) associated with the proposed future intention(s), and/or the aggregate probability value(s) associated with the predicted future intention(s).

The motion and/or trajectory operations are performed so that the AV can safely navigate the roads autonomously. For example, the predicted future intention(s) can be used to determine whether an AV should pass or queue behind a stationary vehicle, perform a cautious maneuver to facilitate the AV's passing of the stationary vehicle, change lanes, and/or actively acquire more information about the detected object. A cautious maneuver may be selected and performed when the detected object is classified as a functionally stopped vehicle since there may be pedestrians adjacent thereto or the vehicle might start moving. The AV may be queued behind a detected object that is classified as a queued vehicle and that is predicted to start moving in a given period of time (e.g., when a pedestrian travels across a cross-walk). The AV may be caused to follow a detected object (e.g., a bus) that is classified as a functionally stopped vehicle, and then caused to pass the detected object when the detected object is determined to have a parked goal. The present solution is not limited to the particulars of this example.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating an autonomous vehicle, comprising:
    using sensor data, by the computing device, to track an object that was detected in proximity to the autonomous vehicle;
    classifying, by the computing device, the object into at least one dynamic state class of a plurality of dynamic state classes, wherein at least two dynamic state classes of the plurality of dynamic state classes indicate different possible reasons for any object being stationary, and a first one of the at least two dynamic state classes comprises a blocking object class and a second one of the at least two dynamic state classes comprises a parked vehicle class, a functionally stopped vehicle class, or a queued vehicle class;
    using, by the computing device, a result from said classifying to determine at least one predicted future intention of the object by:
        accessing, by the computing device, a single hierarchical probability tree comprising a plurality of first nodes respectively associated with a plurality of different dynamic state classes, a plurality of second nodes respectively associated with a plurality of different goal classes, and a plurality of third nodes respectively associated with a plurality of different proposed future intention classes;
        inputting the at least one dynamic state class into the single hierarchical probability tree;
        transforming, by the computing device, the at least one dynamic state class into at least one goal class of the plurality of different goal classes by identifying at least one second node of the second nodes of the single hierarchical tree that is connected to at least one of the first nodes associated with the at least one dynamic state class, wherein the plurality of different goal classes specify possible current aims associated with the object;

transforming, by the computing device, the at least one goal class into at least one proposed future intention class of the plurality of different proposed future intention classes by identifying at least one third node of the third nodes of the single hierarchical tree that is connected to the at least one second node which was previously identified; and determining, by the computing device, the at least one predicted future intention of the object based on the at least one proposed future intention class of the plurality different proposed future intention classes that is associated with the at least one third node which was previously identified; and performing at least one next cycle of said classifying, transforming and determining to obtain at least one next proposed future intention class for the object;

combining a probability associated with the at least one proposed future intention class and a probability associated with the at least one next proposed future intention class to generate an aggregate probability;

causing, by the computing device, the autonomous vehicle to perform at least one autonomous driving operation based on the at least one predicted future intention determined for the object.

2. The method according to claim 1, wherein the plurality of different dynamic state classes further comprise a driving vehicle class.

3. The method according to claim 1, wherein the plurality of different goal classes comprise at least one of a parked goal class, a lane blocking goal class and a follow nominal lane goal class.

4. The method according to claim 1, wherein the plurality of different proposed future intention classes comprise at least one of a stop intention class and a drive intention class.

5. The method according to claim 1, wherein the determining comprises considering the at least one proposed future intention as the at least one predicted future intention.

6. The method according to claim 1, wherein the determining comprises considering the at least one predicted future intention as the at least one proposed future intention when the at least one proposed future intention has a probability value exceeding a threshold value.

7. The method according to claim 1, wherein the autonomous vehicle is caused to perform the at least one autonomous driving operation based additionally on at least one of the at least one dynamic state class, the at least one goal class, a probability value associated with the at least one proposed future intention class, a probability value associated with the at least one predicted future intention, and/or an aggregate probability value associated with the at least one predicted future intention.

8. A system, comprising:
a processor;
a non-transitory computer-readable storage medium comprising programming instructions that are configured to cause the processor to implement a method for operating an autonomous vehicle, wherein the programming instructions comprise instructions to:
use sensor data to track an object that was detected in proximity to the autonomous vehicle;
classify the object into at least one dynamic state class of a plurality of dynamic state classes, wherein at least two dynamic state classes of the plurality of dynamic state classes indicate different possible reasons for any object being stationary, and a first one of the at least two dynamic state classes comprises a blocking object class and a second one of the at least two dynamic state classes comprises a parked vehicle class, a functionally stopped vehicle class, or a queued vehicle class;

use a result from said classifying to determine at least one predicted future intention of the object by:
accessing a single hierarchical probability tree comprising a plurality of first nodes respectively associated with a plurality of different dynamic state classes, a plurality of second nodes respectively associated with a plurality of different goal classes, and a plurality of third nodes respectively associated with a plurality of different proposed future intention classes;

inputting the at least one dynamic state class into the single hierarchical probability tree;

transforming the at least one dynamic state class into at least one goal class of the plurality of different goal classes by identifying at least one second node of the second nodes of the single hierarchical tree that is connected to at least one of the first nodes associated with the at least one dynamic state class, wherein the plurality of different goal classes specify possible current aims associated with the object;

transforming the at least one goal class into at least one proposed future intention class of the plurality of different proposed future intention classes by identifying at least one third node of the third nodes of the single hierarchical tree that is connected to the at least one second node which was previously identified; and determining the at least one predicted future intention of the object based on the at least one proposed future intention class of the plurality of different proposed future intention classes that is associated with the at least one third node which was previously identified;

perform at least one next cycle of said classifying, transforming and determining to obtain at least one next proposed future intention class for the object;

combine a probability associated with the at least one proposed future intention class and a probability associated with the at least one next proposed future intention class to generate an aggregate probability; and cause the autonomous vehicle to perform at least one autonomous driving operation based on the at least one predicted future intention determined for the object.

9. The system according to claim 8, wherein the plurality of different dynamic state classes further comprise a driving vehicle class.

10. The system according to claim 8, wherein the plurality of different goal classes comprise at least one of a parked goal class, a lane blocking goal class and a follow nominal lane goal class.

11. The system according to claim 8, wherein the plurality of different proposed future intention classes comprise at least one of a stop intention class and a drive intention class.

12. The system according to claim 8, wherein the determining comprises considering the at least one proposed future intention as the at least one predicted future intention.

13. The system according to claim 8, wherein the determining comprises considering the at least one predicted future intention as the at least one proposed future intention when the at least one proposed future intention has a probability value exceeding a threshold value.

14. The system according to claim 8, wherein the autonomous vehicle is caused to perform the at least one autonomous driving operation based additionally on at least one of the at least one dynamic state class, the at least one goal class, a probability value associated with the at least one proposed future intention class, a probability value associated with the at least one predicted future intention, and/or an aggregate probability value associated with the at least one predicted future intention.

15. A non-transitory computer-readable medium that stores instructions that, when executed by at least one computing device, will cause the at least one computing device to perform operations comprising:

using sensor data to track an object that was detected in proximity to the autonomous vehicle;

classifying the object into at least one dynamic state class of a plurality of dynamic state classes, wherein at least two dynamic state classes of the plurality of dynamic state classes indicate different possible reasons for any object being stationary, and a first one of the at least two dynamic state classes comprises a blocking object class and a second one of the at least two dynamic state classes comprises a parked vehicle class, a functionally stopped vehicle class, or a queued vehicle class;

using a result from said classifying to determine at least one predicted future intention of the object by:

accessing a single hierarchical probability tree comprising a plurality of first nodes respectively associated with a plurality of different dynamic state classes, a plurality of second nodes respectively associated with a plurality of different goal classes, and a plurality of third nodes respectively associated with a plurality of different proposed future intention classes;

inputting the at least one dynamic state class into the single hierarchical probability tree;

transforming the at least one dynamic state class into at least one goal class of the plurality of different goal classes by identifying at least one second node of the second nodes of the single hierarchical tree that is connected to at least one of the first nodes associated with the at least one dynamic state class, wherein the plurality of different goal classes specify possible current aims associated with the object;

transforming the at least one goal class into at least one proposed future intention class of the plurality of different proposed future intention classes by identifying at least one third node of the third nodes of the single hierarchical tree that is connected to the at least one second node which was previously identified; and determining the at least one predicted future intention of the object based on the at least one proposed future intention class of the plurality different proposed future intention classes that is associated with the at least one third node which was previously identified;

performing at least one next cycle of said classifying, transforming and determining to obtain at least one next proposed future intention class for the object;

combining a probability associated with the at least one proposed future intention class and a probability associated with the at least one next proposed future intention class to generate an aggregate probability; and causing, by the computing device, the autonomous vehicle to perform at least one autonomous driving operation based on the at least one predicted future intention determined for the object.

* * * * *